United States Patent
Ohashi et al.

(10) Patent No.: US 9,300,174 B2
(45) Date of Patent: Mar. 29, 2016

(54) STATOR-CORE FIXING STRUCTURE FOR ROTATING ELECTRIC MACHINE

(71) Applicant: Mitsubishi Electric Corporation, Chiyoda-ku, Tokyo (JP)

(72) Inventors: Naoki Ohashi, Chiyoda-ku (JP); Koichi Ojima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 258 days.

(21) Appl. No.: 14/013,686

(22) Filed: Aug. 29, 2013

(65) Prior Publication Data

US 2014/0300245 A1 Oct. 9, 2014

(30) Foreign Application Priority Data

Apr. 9, 2013 (JP) .................. 2013-080976

(51) Int. Cl.
*H02K 1/06* (2006.01)
*H02K 1/18* (2006.01)
*H02K 5/22* (2006.01)

(52) U.S. Cl.
CPC ................ *H02K 1/185* (2013.01); *H02K 5/225* (2013.01)

(58) Field of Classification Search
CPC ............................... H02K 1/185; H02K 5/225
USPC .................................................. 310/216.118
See application file for complete search history.

(56) References Cited

U.S. PATENT DOCUMENTS

| | | | | |
|---|---|---|---|---|
| 5,585,682 A | * | 12/1996 | Konicek et al. | 310/89 |
| 6,150,747 A | * | 11/2000 | Smith et al. | 310/216.137 |
| 2011/0227446 A1 | * | 9/2011 | Vedy | 310/216.118 |
| 2012/0242186 A1 | | 9/2012 | Hattori | |

FOREIGN PATENT DOCUMENTS

| | | |
|---|---|---|
| JP | 62-130865 U | 8/1987 |
| JP | 2003-199291 A | 7/2003 |
| JP | 2010-172077 A | 8/2010 |
| WO | 2011/080817 A1 | 7/2011 |

OTHER PUBLICATIONS

Japanese Office Action (Reasons), issued May 20, 2014 in Patent Application No. 2013-080976.

* cited by examiner

*Primary Examiner* — Hanh Nguyen
(74) *Attorney, Agent, or Firm* — Sughrue Mion, PLLC

(57) ABSTRACT

The objective is to prevent the flange of a ring member for holding the stator core from enlarging the diameter of a rotating electric machine and to eliminate a screwing space and a pedestal portion in the housing case so as to suppress the weight of the rotating electric machine from increasing; one end of the ring member for holding the stator core protrudes from the outer circumference of the stator core toward the rotation axle and the ring member is fixed to the cover or the housing case at the protruding portion.

8 Claims, 6 Drawing Sheets

STATOR-CORE FIXING STRUCTURE FOR ROTATING ELECTRIC MACHINE

BACKGROUND OF THE INVENTION

1. Field of the Invention

The present invention relates to a stator-core fixing structure for a rotating electric machine.

2. Description of the Related Art

With regard to a conventional rotating electric machine, a stator-core fixing structure has been proposed in which a flange for holding a stator core is provided in a ring member and the flange is screwed and fixed to a housing case (e.g., Patent Document 1).

In such a conventional stator-core fixing structure, a flange portion, which is the outer circumference, of a ring member, that radially protrudes, is formed and screwed to the housing case; therefore, the outer diameter of a portion that is screwed to the housing case increases necessarily; moreover, because a pedestal portion for screwing needs to be provided in the housing case, the thickness of the housing case increases and hence the overall weight of the apparatus also increases.

Furthermore, in the case where part of the housing case is covered with a cover member, a screwing portion needs to be provided in the cover member in such a way as to avoid a portion, of the housing case, at which the flange portion and the housing case are screwed to each other, thereby causing the outer diameter to increase or causing the structure to become complex.

After the flange portion and the housing case are screwed to each other, the rotor and the cover member are inserted and then the cover member is screwed and fixed to the housing case; however, it is required to make the respective centers of the rotor and the stator coincide with each other with respect to the housing case.

Accordingly, in order to secure a gap between the rotor and the stator, it is required to consider central-point displacement between the housing case and the ring member; therefore, as a result, the gap between the rotor and the stator is enlarged and hence the outer diameter of the rotating electric machine may increase.

As a means to cope with the enlargement of the outer diameter, a means is conceivable in which a single and the same screw is utilized for both fixing the flange portion of the ring member to the housing case and fixing the cover member to the housing case and the flange portion of the ring member, the housing case, and the cover member are integrally screwed to one another.

However, in the case of the structure in which the flange portion of the ring member, the housing case, and the cover member are integrally screwed to one another, it is required that in order to prevent external water or oil from intruding therein, liquid packing materials or gaskets need to be provided between the members, thereby causing the material costs to increase or causing the assembly to become complicated.

In the case where liquid packing materials or gaskets are provided, it is required that the flatness of the flange portion and the degree of parallelism between the top and bottom sides of the flange portion are accurately maintained; therefore, in many cases, cutting processing for the flange portion is required and hence the apparatus becomes expensive.

Moreover, when the rotating electric machine is assembled, the ring member holding the stator is inserted into the housing case and then the cover member to which the rotor is fixed and the housing case are coupled with each other; however, in the case of a permanent-magnet rotating electric machine, the stator and the rotor are attracted to each other by the magnetic force of a permanent magnet; therefore, the ring member may be attracted by the rotor and may travel. Therefore, because it is required to assemble the rotating electric machine while supporting the housing case and the ring member by a positioning mechanism or while limiting the travel of the ring member, the material cost may increase or the assembly plant and the assembly method may become complex and complicated.

PRIOR ART REFERENCE

Patent Document

[Patent Document 1] International Publication No. WO2011-080817A1

As described above, a conventional stator-core fixing structure for a rotating electric machine has caused the size of an overall apparatus and the weight thereof to increase. Moreover, there has been a problem that the material cost increases or the assembly plant and the assembly method become complex and complicated and hence the apparatus becomes expensive.

SUMMARY OF THE INVENTION

The present invention has been implemented in order to solve the foregoing problem; the objective thereof is to provide a stator-core fixing structure, for a rotating electric machine, that is inexpensive and does not cause an apparatus to become large.

A stator-core fixing structure for a rotating electric machine according to the present invention is configured in such a way that one end of the ring member for holding the stator core protrudes from the outer circumference of the stator core toward the rotation axle and the ring member is fixed to the cover or the housing case at the protruding portion.

The present invention makes it possible to prevent a flange from enlarging the diameter of an apparatus and to eliminate a screwing space and a pedestal portion in the housing case; therefore, there is demonstrated an effect that the weight of the apparatus can be suppressed from increasing.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 4A is a top view, in the axis direction, of a partially broken rotating electric machine, and FIG. 4B is a cross-sectional view taken along B-B line;

FIG. 7A is a top view, in the axis direction, of a partially broken rotating electric machine; FIG. 7B is a cross-sectional view taken along C-C line.

DETAILED DESCRIPTION OF THE PREFERRED EMBODIMENTS

Figure 1:
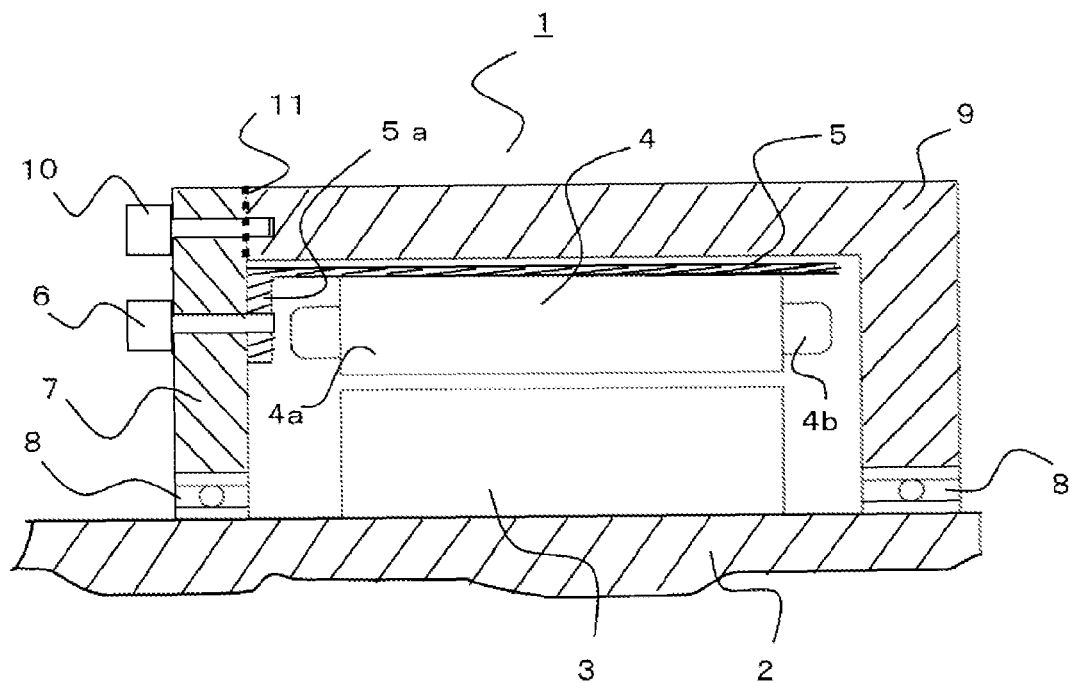
FIG. 1 is a cross-sectional view of principal parts illustrating a stator-core fixing structure for a rotating electric machine according to Embodiment 1 of the present invention.

Hereinafter, the present invention will be explained with reference to the drawings, which are embodiments thereof. In each of the drawings, the same reference characters denote the same or similar constituent elements.

Embodiment 1

FIG. 1 is a cross-sectional view of principal parts illustrating a stator-core fixing structure for a rotating electric machine according to Embodiment 1 of the present invention.

In FIG. 1, a rotating electric machine 1 is configured including a rotor 3 mounted on a rotation axle 2 and a stator 4 that is formed in the shape of a ring facing the rotor 3. The stator 4 is configured in such a way that a stator coil 4b is wound around a stator core 4; the stator 4 is fixed by inserting the stator core 4a into a ring member 5 formed of iron, through shrink fitting or press fitting. A flange portion 5a, which is a part of ring member 5 bent to its inner side facing the rotation axle 2, is formed at one end of the ring member 5; the flange portion 5a is screwed to a cover 7 by a screw 6, so that the stator 4 is fixed to the cover 7.

The cover 7 is formed by applying die-cast molding to aluminum and pivotably supports the rotation axle 2 through the intermediary of a bearing 8. The ring member 5 is aligned with the rotation axle 2 coupled with the cover 7 and then is screwed to the cover 7.

After that, the outer circumference of the ring member 5 is covered with a cylindrical housing case 9 that pivotably supports the other end of the rotation axle 2 through the intermediary of a bearing 8; then, the end face of the housing case 9 is made to abut against the cover 7 with a liquid packing material or a gasket 11 inserted between them and is screwed to the cover 7 with a screw 10. The housing case 9 is formed by applying die-cast molding to aluminum.

As described above, the flange portion 5a, which is one end, of the ring member 5, that is bent inward, is screwed to the cover 7; therefore, because the mounting portion of the ring member 5 does not protrude outward from the outer circumference of the stator 4, the overall outer diameter of the rotating electric machine 1 can be suppressed. Because the ring member 5 can be screwed directly to the cover 7 without inserting a liquid packing material or a gasket, the respective center axes of the rotor 3 and the stator 4 can accurately be aligned with each other; as a result, the gap between the rotor 3 and the stator 4 can be decreased, thereby reducing the overall outer diameter of the rotating electric machine 1. Moreover, when the ring member 5 and the cover 7 are coupled with each other, no positioning mechanism needed to be provided; therefore, the apparatus becomes inexpensive.

Embodiment 2

Figure 2:
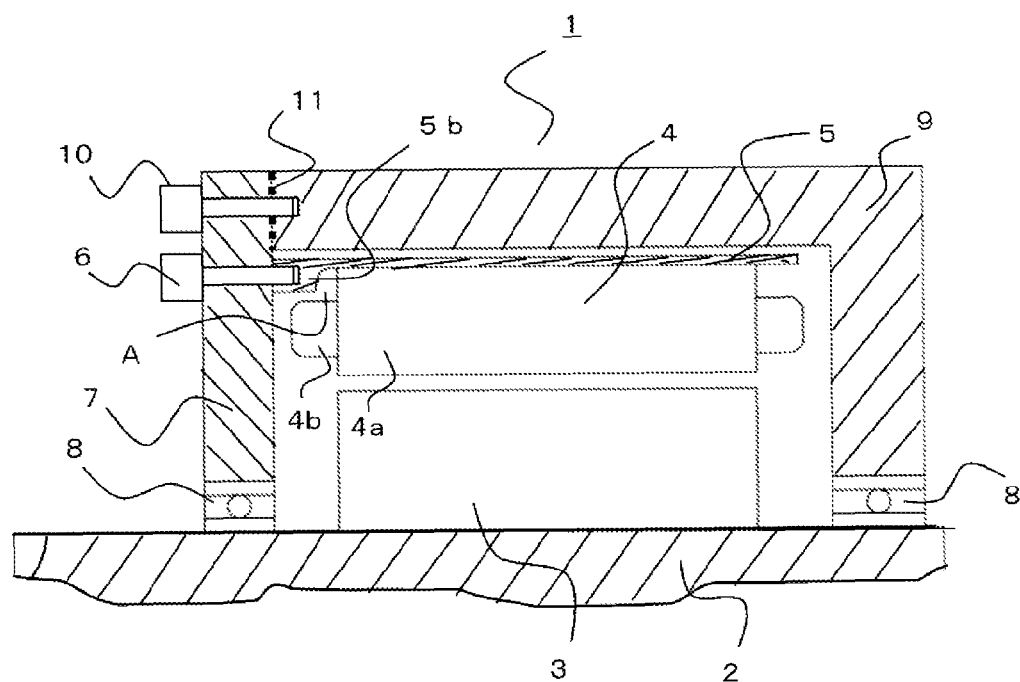
FIG. 2 is a cross-sectional view of principal parts illustrating a stator-core fixing structure for a rotating electric machine according to Embodiment 2 of the present invention.

FIG. 2 is a cross-sectional view of principal parts illustrating a stator-core fixing structure for a rotating electric machine according to Embodiment 2 of the present invention.

In FIG. 2, the ring member 5 is configured in such a way that a thick portion 5b is formed at one end thereof and the thick portion 5b is directly screwed to the cover 7 with the screw 6. Other configurations are the same as those in FIG. 1; therefore, explanation therefore will be omitted.

The foregoing configuration makes it possible to provide a screwing portion in a space (core back) A, which is formed of the stator core 4a and the stator coil 4b and is usually not utilized; as a result, because the axis-direction length can be reduced, further downsizing can be achieved. Moreover, unlike Embodiment 1, it is not required to provide a flange, which is usually a fragile portion; therefore, the strength of the fixing structure can be raised.

Figure 3:
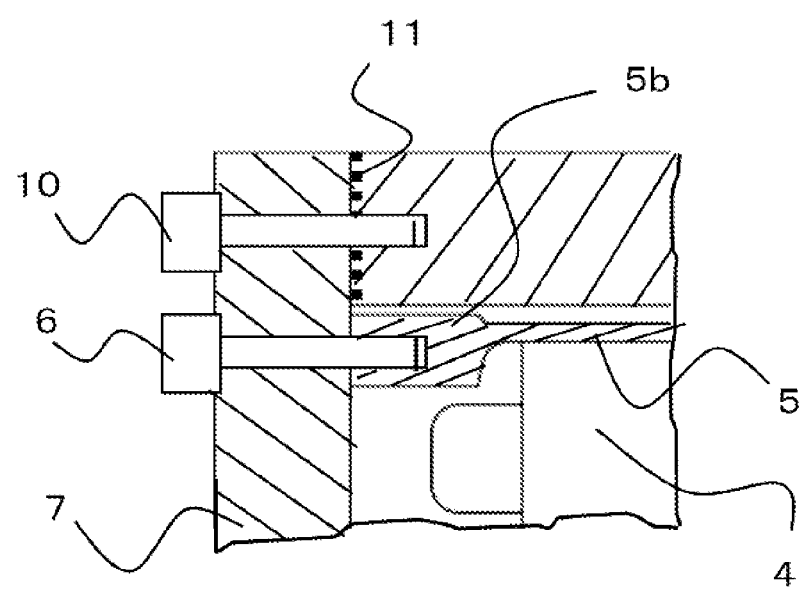
FIG. 3 is a cross-sectional view illustrating a variant example of stator-core fixing structure for a rotating electric machine according to Embodiment 2 of the present invention.

It may be allowed that the whole thick portion 5b does not protrude toward the stator coil 4b, but, as illustrated in FIG. 3, part of the thick portion 5b protrudes outward in the radial direction of the stator 4.

Embodiment 3

Figure 4A:
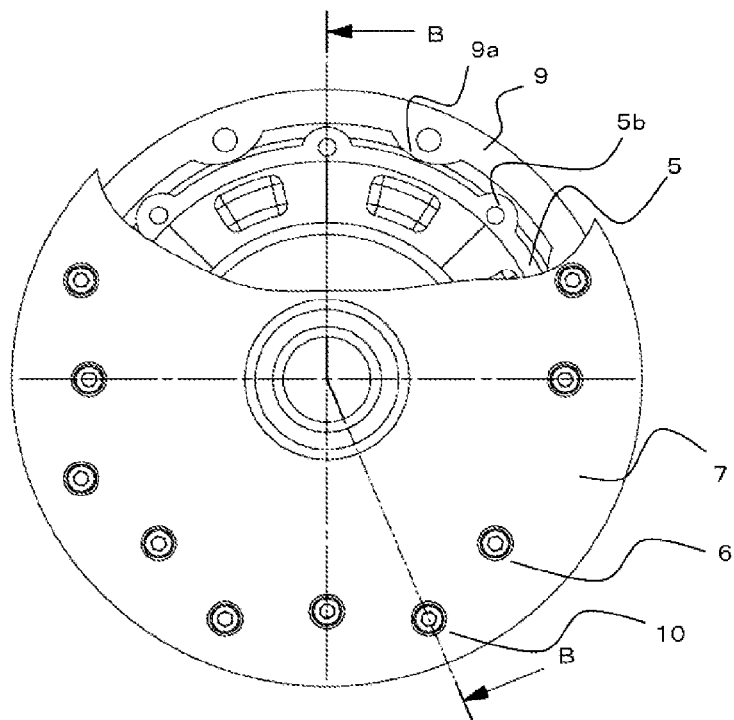
FIGS. 4A and 4B are views illustrating a stator-core fixing structure for a rotating electric machine according to Embodiment 3 of the present invention.
Figure 4B:
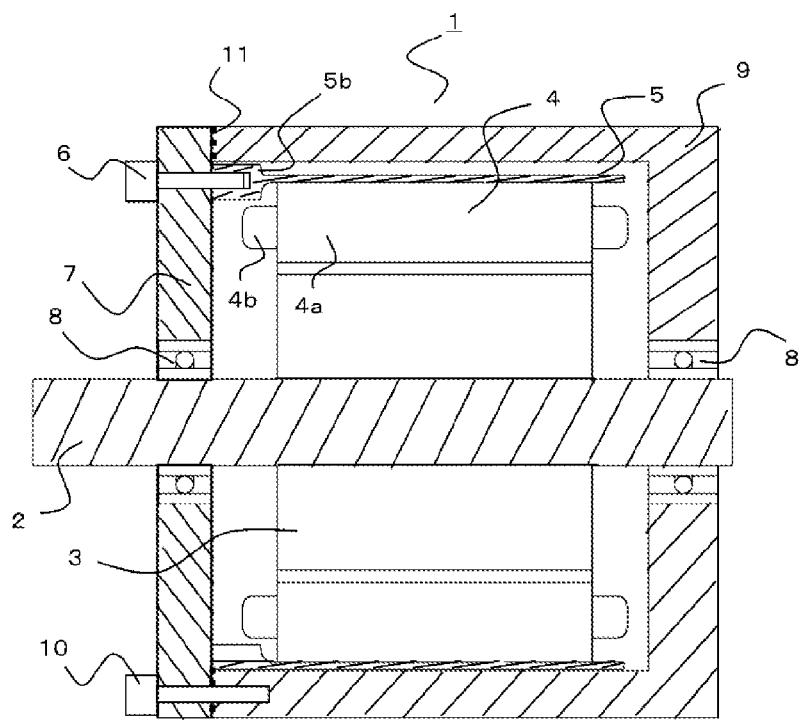

FIGS. 4A and 4B are a set of views, i.e., a top view of a partially broken rotating electric machine and a cross-sectional view taken along B-B line illustrating a stator-core fixing structure for a rotating electric machine according to Embodiment 3 of the present invention.

In FIGS. 4A and 4B, part of the ring member 5 supporting the stator core 4a protrudes outward in the radial direction, so that a thick portion 5b is formed; at the thick portion 5b, the ring member 5 is screwed to the cover 7 with the screw 6. Part of the housing case 9 protrudes inward in the radial direction at a position that is shifted in the circumferential direction from the thick portion 5b of the ring member 5, so that a thick portion 9a thereof is formed; at the thick portion 9a, the housing case 9 is screwed to the cover 7 with the screw 10. Other configurations are the same as those in FIG. 1; therefore, explanation therefore will be omitted.

The foregoing configuration makes it possible that the thick portions 5b and 9a of the ring member 5 and the housing case 9, for which strength is required in particular, are arranged in such a way as to not overlap with each other in the radial direction; as a result, the outer diameter of the rotating electric machine 1 can be reduced.

Embodiment 4

Figure 5:
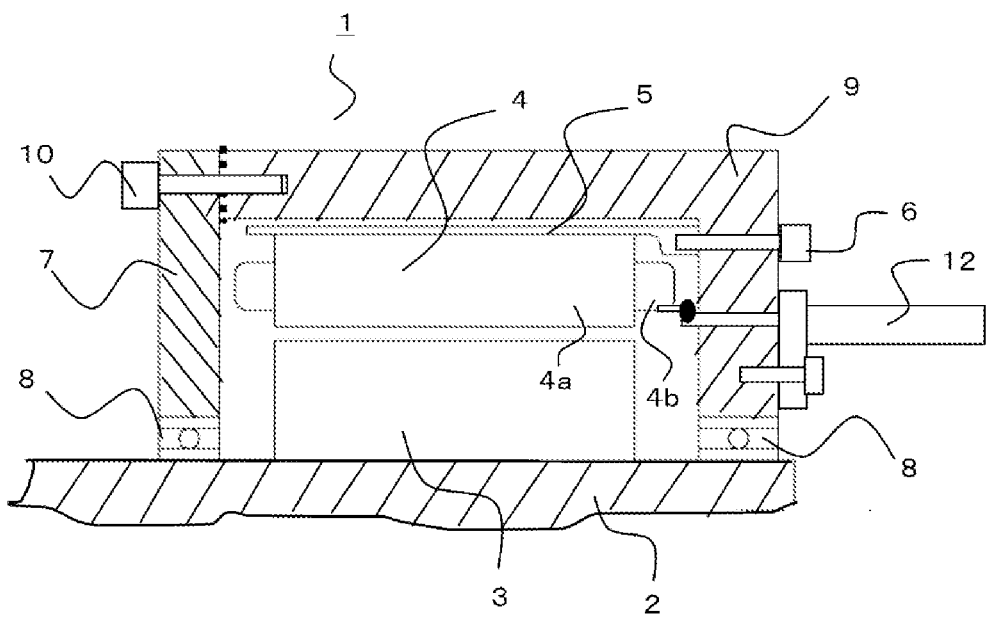
FIG. 5 is a cross-sectional view illustrating a stator-core fixing structure for a rotating electric machine according to Embodiment 4 of the present invention.

FIG. 5 is a cross-sectional view illustrating a stator-core fixing structure for a rotating electric machine according to Embodiment 4 of the present invention.

In FIG. 5, a thick portion 5b of the ring member 5 supporting the stator core 4a is provided at the side of the housing case 9; the ring member 5 is screwed and fixed to the bottom side of the housing case 9.

An input terminal 12 is mounted in such a way as to penetrate the bottom portion of the housing case 9; the terminal of the stator coil 4b is welded to and connected with the input terminal 12 so that operational power is supplied to the stator coil 4b from the outside. Other configurations are the same as those in FIG. 1; therefore, explanation therefore will be omitted.

In the case where it is difficult to supply electric power to the stator coil 4b through the cover 7, the supply of electric power is performed through the bottom side of the housing case 9, as described above, so that a space can be secured at the side of the cover 7. Because the position (welding portion) at which the stator coil 4b and the input terminal 12 are welded together and the position at which the ring member 5 is screwed to the housing case 9 are adjacent to each other, the difference between the respective vibration phases at the foregoing positions is not likely to occur; thus, the vibration can be suppressed from causing damage to the welding portion and hence the vibration resistance of the rotating electric machine 1 can be raised.

Embodiment 5

Figure 6:
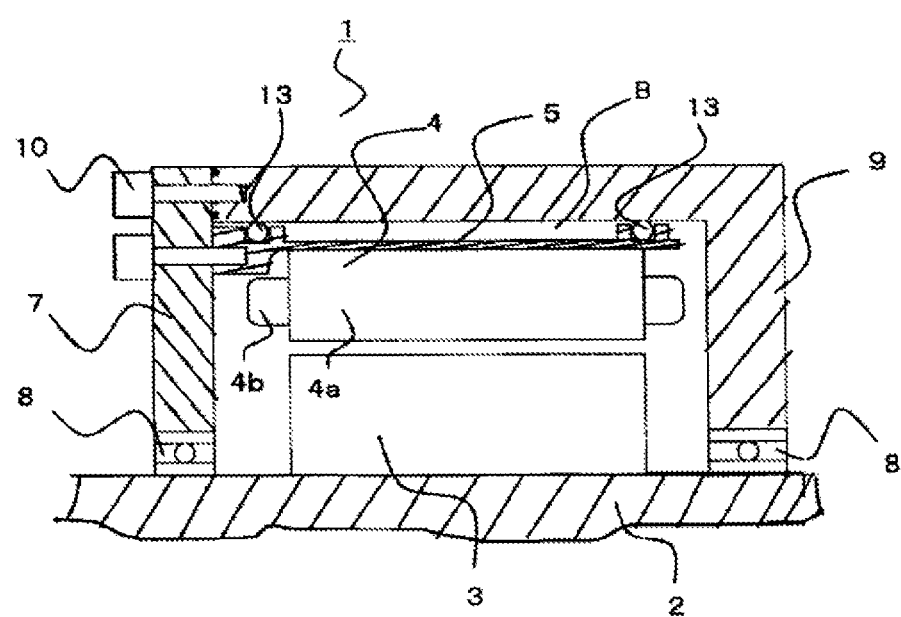
FIG. 6 is a cross-sectional view illustrating a stator-core fixing structure for a rotating electric machine according to Embodiment 5 of the present invention.

FIG. 6 is a cross-sectional view illustrating a stator-core fixing structure for a rotating electric machine according to Embodiment 5 of the present invention.

In FIG. 6, ring-shaped grooves are provided in the both outer circumferences of the ring member 5, resin sealing members 13 are inserted into the grooves, and the ring member 5 is pressed to the side wall of the housing case 9; the ring member 5, the housing case 9, and the sealing members 13 form a space B surrounding the outer circumference of the ring member 5. Other configurations are the same as those in FIG. 1; therefore, explanation therefore will be omitted.

When the stator core is utilized in the rotating electric machine 1, cooling water is supplied to the space B formed as described above, and this cooling water can cool the ring member 5 and the stator core 4a, which is a heating element.

In other words, when the grooves are provided in the ring member 5 and the sealing members 13 are added, it is made possible to cool the stator core 4a without providing an extra cooling-water path in the housing case 9; as a result, the outer diameter of the rotating electric machine 1 can be reduced.

It is also made possible to form the grooves for holding the seal members 13 in the inner circumference of the housing case 9 instead of the outer circumferences of the ring member 5; the same effect can be demonstrated.

Embodiment 6

Figure 7A:
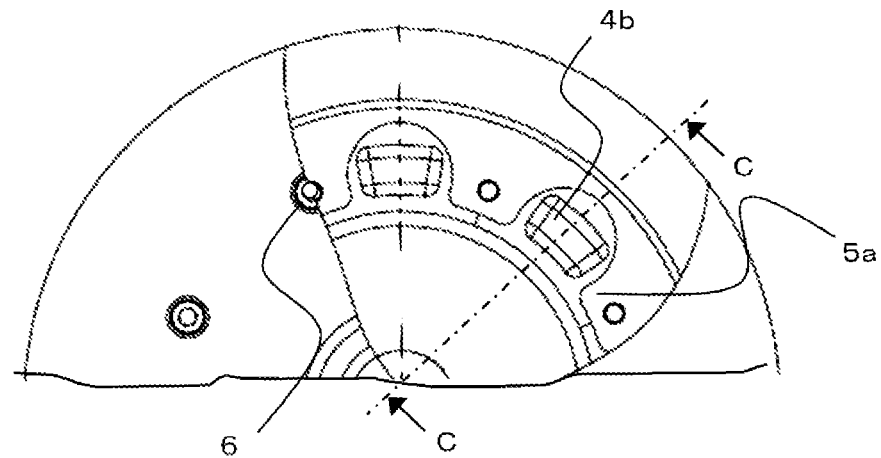
FIGS. 7A and 7B are views illustrating a stator-core fixing structure for a rotating electric machine according to Embodiment 6 of the present invention.
Figure 7B:
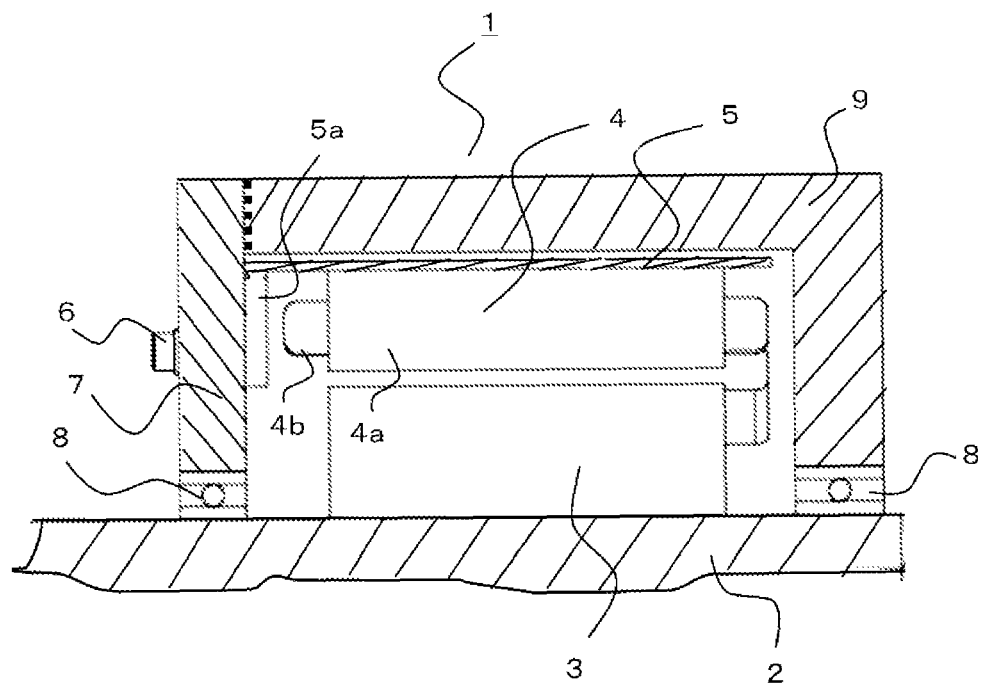

FIGS. 7A and 7B are a set of views, i.e., a top view of a partially broken rotating electric machine and a cross-sectional view taken along C-C line illustrating a stator-core fixing structure for a rotating electric machine according to Embodiment 6 of the present invention. In FIGS. 7A and 7B, the ring member 5 is configured in such a way that part, of the flange portion 5a, that faces one end of the stator coil 4b is notched so that the one end of the stator coil 4b can directly be viewed in the axis direction. Other configurations are the same as those in FIG. 1; therefore, explanation therefore will be omitted.

The foregoing configuration makes it possible that when the stator core 4a is fixed to the ring member 5 with the screw 6, a varnish-coating syringe is inserted through the notched portion; therefore, coating with coil-fixing varnish is readily performed without increasing the outer diameter of the rotating electric machine 1.

Such a configuration as to notch the portion facing the stator coil 4b can also be applied to other Embodiments in which the thick portion 5b is formed.

Various modifications and alterations of this invention will be apparent to those skilled in the art without departing from the scope and spirit of this invention, and it should be understood that this is not limited to the illustrative embodiments set forth herein.

What is claimed is:

1. A stator-core fixing structure for a rotating electric machine, comprising:
a rotor mounted on a rotation axle;
a stator that has a stator core and a stator coil wound around the stator core and is disposed in such a way as to face the rotor;
a cylindrical ring member that is mounted on the outer circumference of the stator core and holds the stator core;
a cylindrical housing case that surrounds the outer circumference of the ring member; and
a disk-shaped cover that seals an opening portion of the housing case, wherein one end of the ring member protrudes from the outer circumference of the stator core toward the rotation axle and the ring member is fixed to the cover or the housing case at the protruding portion,
wherein a first fixing portion, of the ring member, at which the ring member is fixed to the cover protrudes radially outward, and wherein a second fixing portion, of the housing case, at which the housing case is fixed to the cover protrudes radially inward in such a way that the phase thereof is shifted from the first fixing portion in the rotation direction.

2. The stator-core fixing structure for a rotating electric machine according to claim 1, wherein after being fixed to the cover mounted on the rotation axle, the ring member is inserted into the cylinder of the housing case, and then the cover and the housing case are fixed to each other.

3. The stator-core fixing structure for a rotating electric machine according to claim 1, wherein a ring-shaped groove is provided in the outer circumference of the ring member or in the inner circumference of the housing case and a seal member is disposed in the groove so that a cooling space is formed in such a way as to be enclosed by the outer circumference of the ring member, the seal member, and the inner circumference of the housing case.

4. The stator-core fixing structure for a rotating electric machine according to claim 1, wherein part, of the ring member, that faces the stator coil is notched and the ring member is fixed to the cover at a position between the stator coils.

5. A stator-core fixing structure for a rotating electric machine, comprising:
a rotor mounted on a rotation axle;
a stator that has a stator core and a stator coil wound around the stator core and is disposed in such a way as to face the rotor;
a cylindrical ring member that is mounted on the outer circumference of the stator core;
a cylindrical housing case that surrounds the outer circumference of the ring member; and
a disk-shaped cover that seals an opening portion of the housing case, wherein there is formed a thick portion that is one end of the ring member and is thicker than a portion thereof on which the stator core is mounted, and the ring member is screwed to the cover at the thick portion,
wherein a first fixing portion, of the ring member, at which the ring member is fixed to the cover protrudes radially outward, and wherein a second fixing portion, of the housing case, at which the housing case is fixed to the cover protrudes radially inward in such a way that the phase thereof is shifted from the first fixing portion in the rotation direction.

6. The stator-core fixing structure for a rotating electric machine according to claim 5, wherein after being fixed to the cover mounted on the rotation axle, the ring member is inserted into the cylinder of the housing case, and then the cover and the housing case are fixed to each other.

7. The stator-core fixing structure for a rotating electric machine according to claim 5, wherein a ring-shaped groove is provided in the outer circumference of the ring member or in the inner circumference of the housing case and a seal member is disposed in the groove so that a cooling space is formed in such a way as to be enclosed by the outer circumference of the ring member, the seal member, and the inner circumference of the housing case.

8. The stator-core fixing structure for a rotating electric machine according to claim 5, wherein part, of the ring member, that faces the stator coil is notched and the ring member is fixed to the cover at a position between the stator coils.

* * * * *